United States Patent [19]

Diggs

[11] 4,199,406
[45] * Apr. 22, 1980

[54] APPARATUS FOR DESALINATING WATER

[76] Inventor: Richard E. Diggs, 12A Rd., Carthage, Mo. 64836

[*] Notice: The portion of the term of this patent subsequent to Oct. 3, 1995, has been disclaimed.

[21] Appl. No.: 868,998

[22] Filed: Jan. 12, 1978

Related U.S. Application Data

[62] Division of Ser. No. 625,850, Oct. 28, 1975, Pat. No. 4,118,283.

[51] Int. Cl.² .......................... C02B 1/04; B01D 3/10; F24J 3/02
[52] U.S. Cl. .................................. 202/176; 202/177; 202/205; 202/234; 202/236; 159/8; 203/2; 203/11; 203/49; 203/90; 203/DIG. 1
[58] Field of Search ............. 203/10, 11, 100, DIG. 1, 203/99, 91, 49, 2, DIG. 17, DIG. 18, 22, 90; 202/234, 236, 205, 262, 176, 177, 180, 160; 159/7, 8, 15, 15 F

[56] References Cited

U.S. PATENT DOCUMENTS

| 2,262,727 | 11/1941 | Smith | 214/17 B |
|---|---|---|---|
| 3,111,461 | 11/1963 | Hickman | 202/236 |
| 3,170,852 | 2/1965 | Barnhart | 202/236 |
| 3,210,260 | 10/1965 | Denkler et al. | 203/89 |
| 3,358,739 | 12/1967 | Pinkerton et al. | 203/49 |
| 3,833,044 | 9/1974 | Wallace | 202/234 |

Primary Examiner—Wilbur L. Bascomb, Jr.
Attorney, Agent, or Firm—Shoemaker and Mattare, Ltd.

[57] ABSTRACT

An apparatus and method for removing contaminants from water having solid contaminants dissolved therein. Contaminated water flows across a grid and into a storage tank. The grid utilizes solar energy to heat that water to a predetermined temperature. A heat transfer structure which is dome-shaped and receives water from the storage tank and a preheater means utilizing solar energy heats the water to a further predetermined temperature. An evaporator means receives the heated water and exposes it to a vacuum condition so that the temperature of the water is above the saturation temperature. The water is thus vaporized, and solid contaminants dissolved therein are separated therefrom. The solids are deposited on a plurality of moving belts and are then moved into a solids removal system. The solids removal system comprises a plurality of trap door pairs upon which the solids are deposited and which are sequentially opened so that the vacuum conditions existing in the evaporator are not disturbed. Vapor transferring means removes the water vapor from the evaporator and transfers it to the heat transfer structure wherein it is condensed to form distillate which is free of solid contaminants. Distillate removal means then removes the distillate from the heat transfer structure to collection or usage means.

14 Claims, 21 Drawing Figures

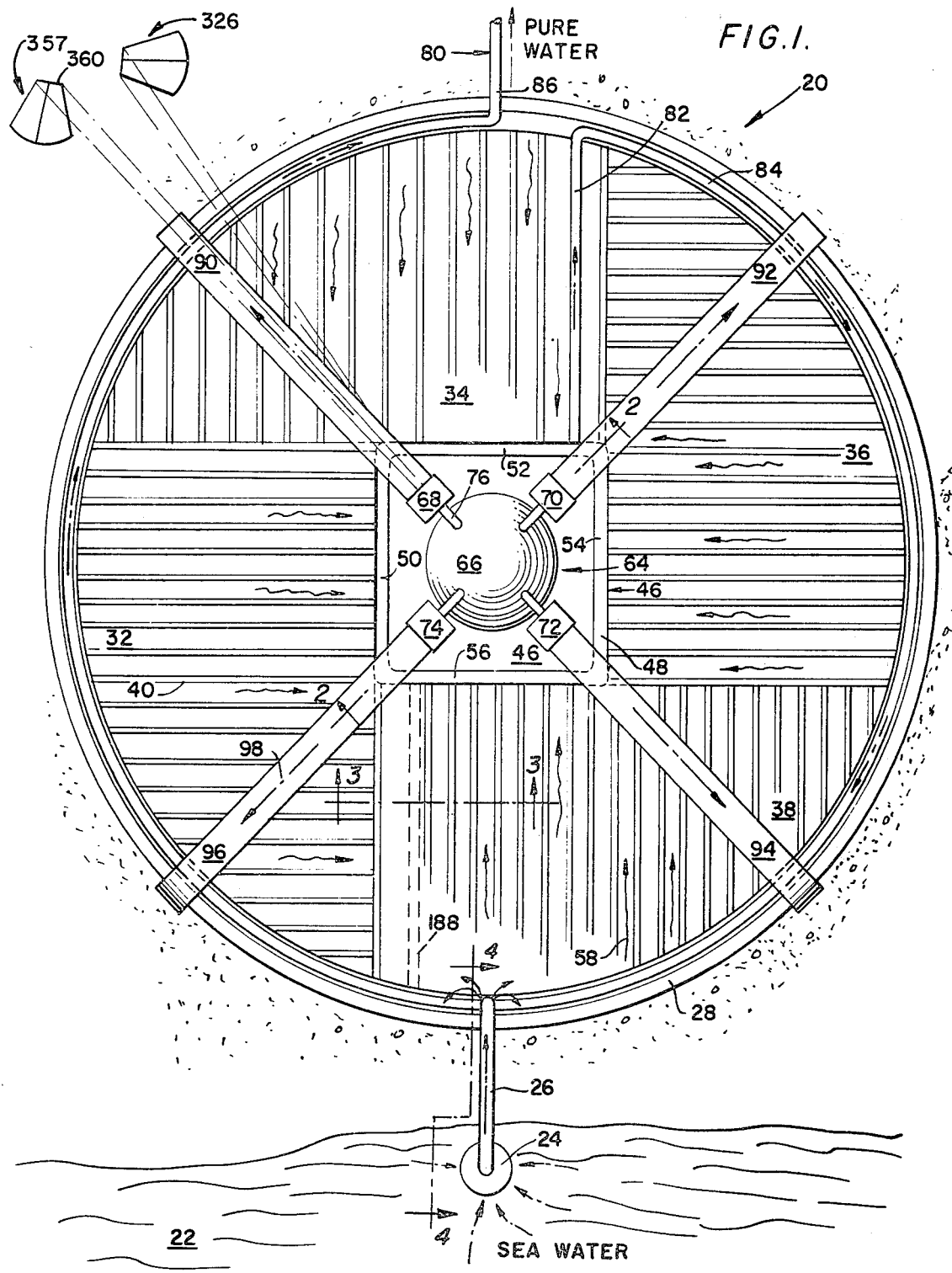

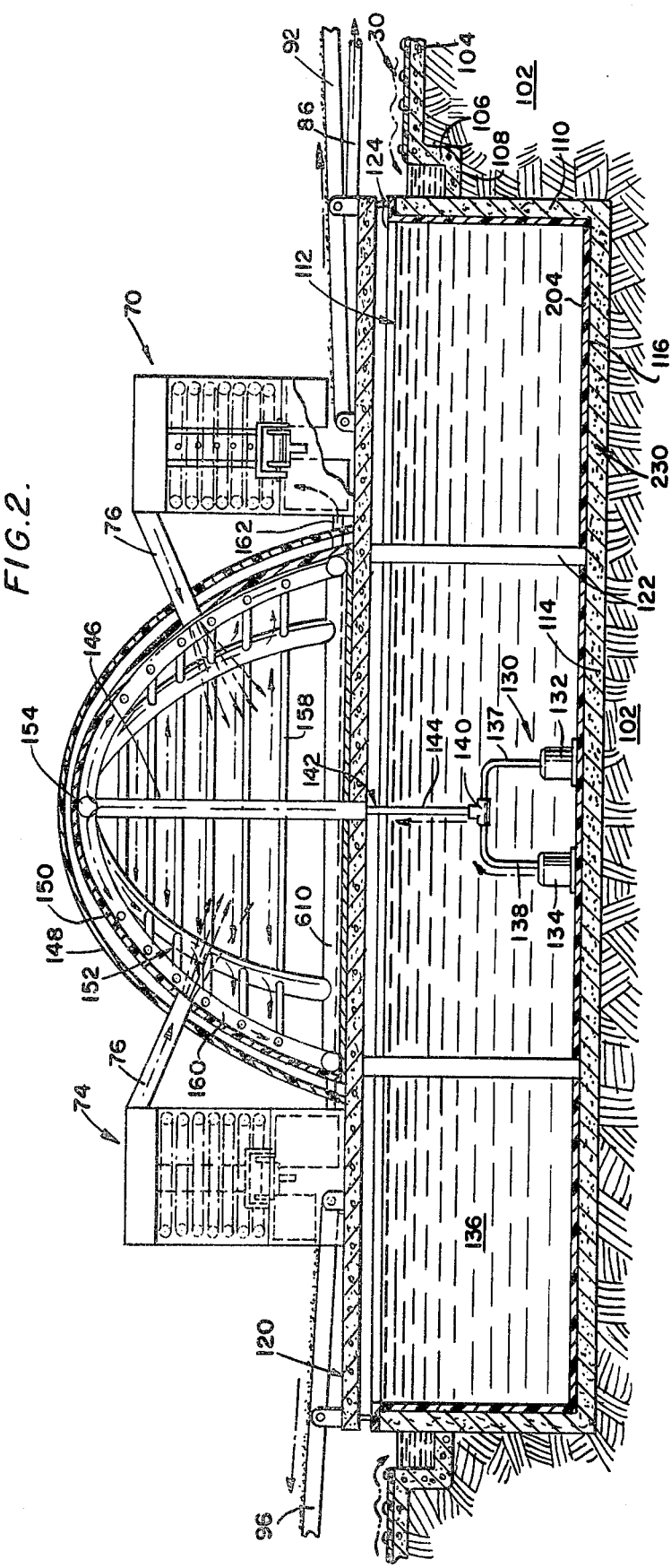
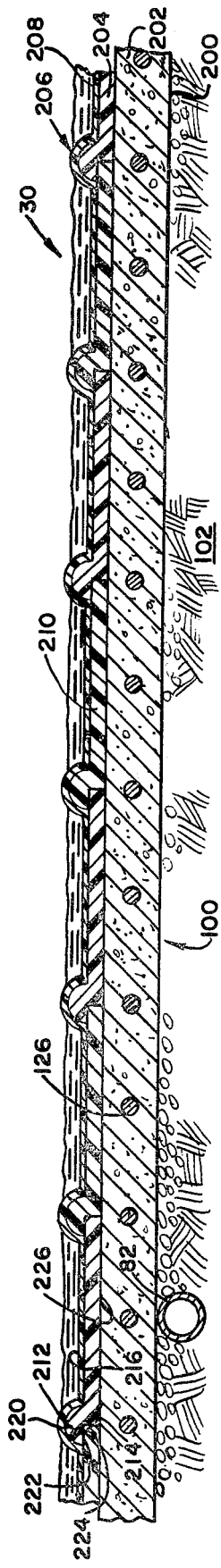

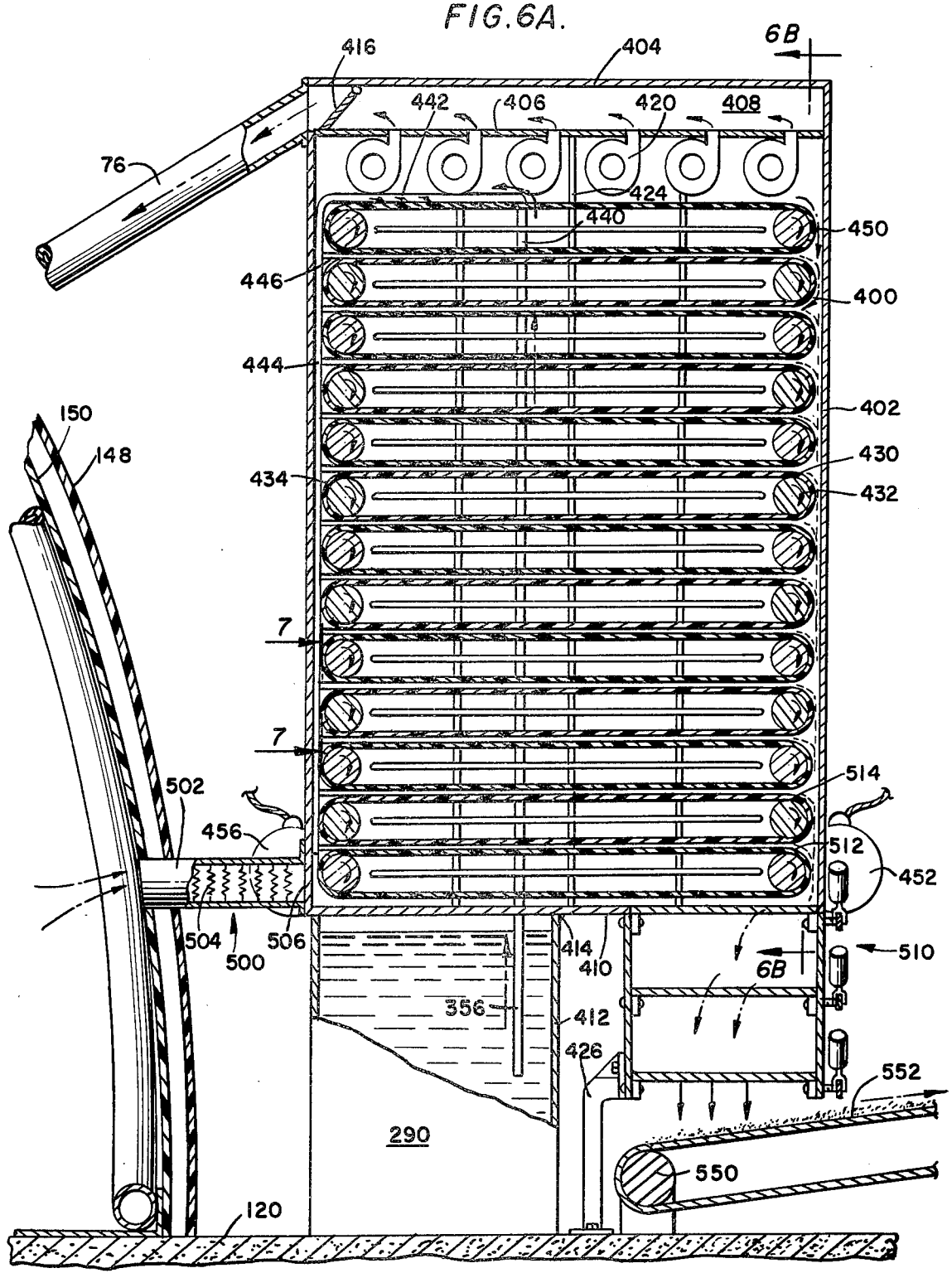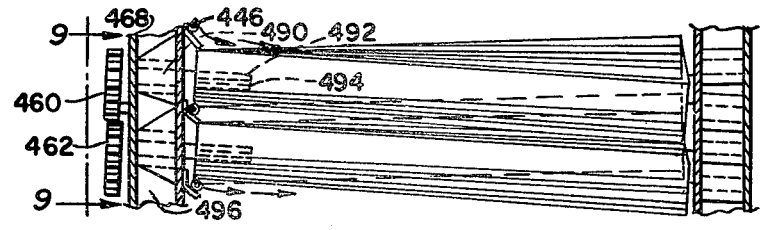

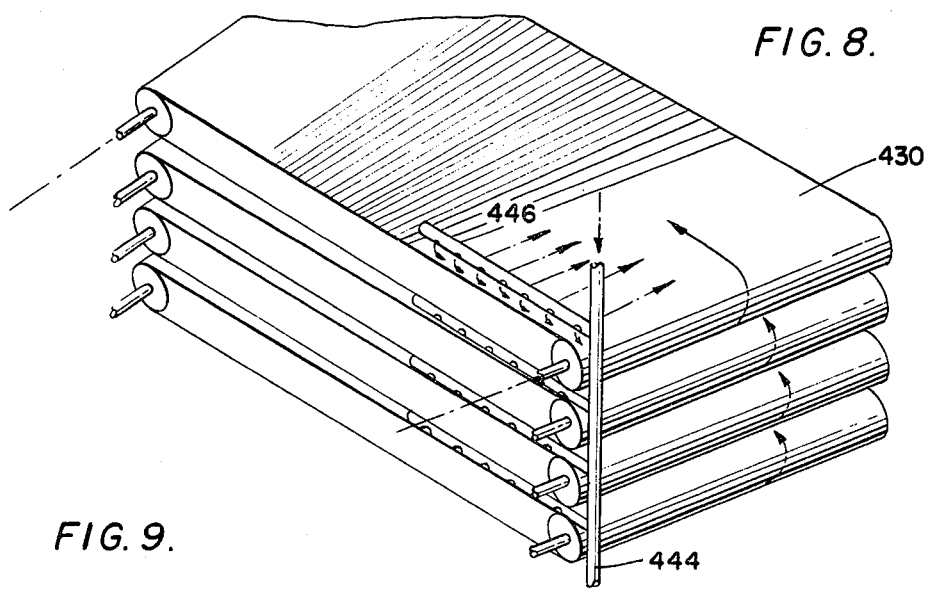
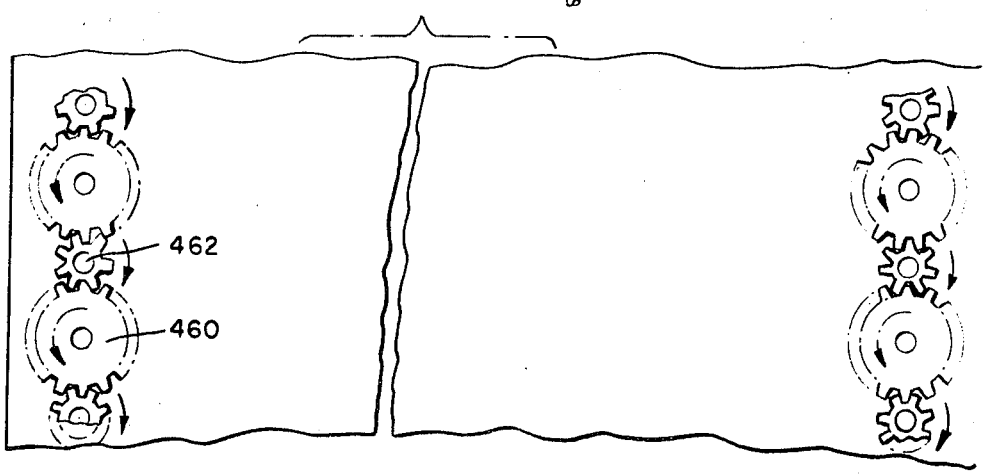
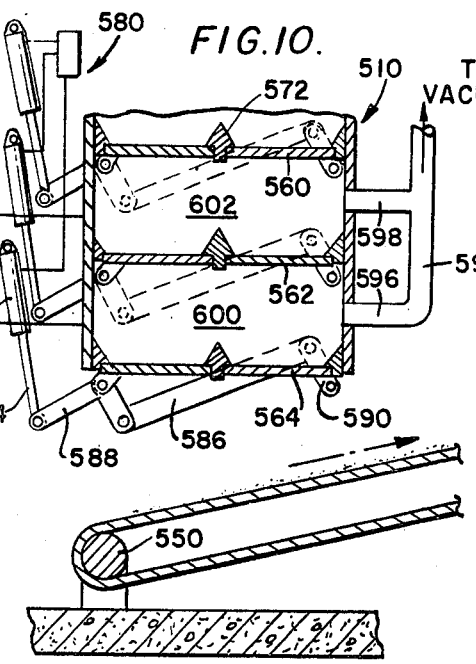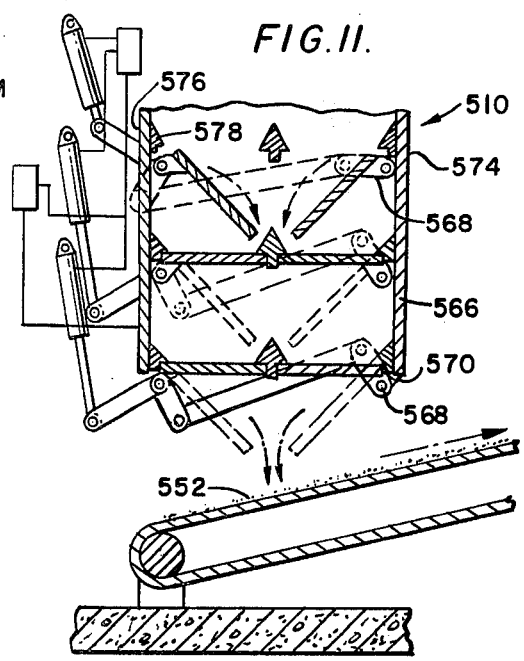

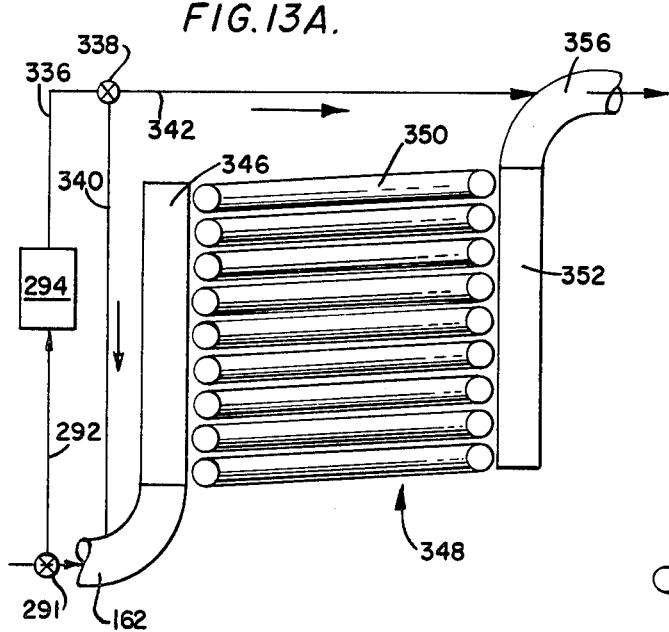
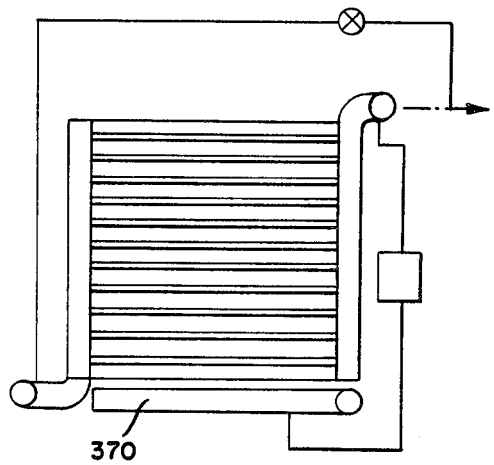
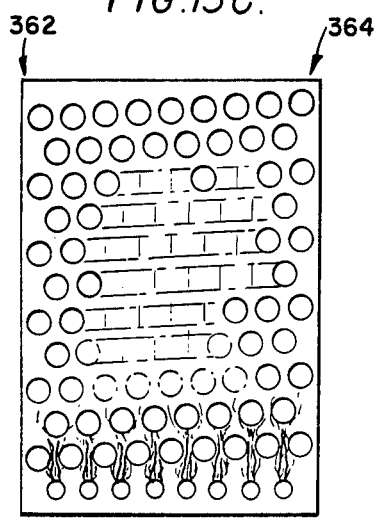
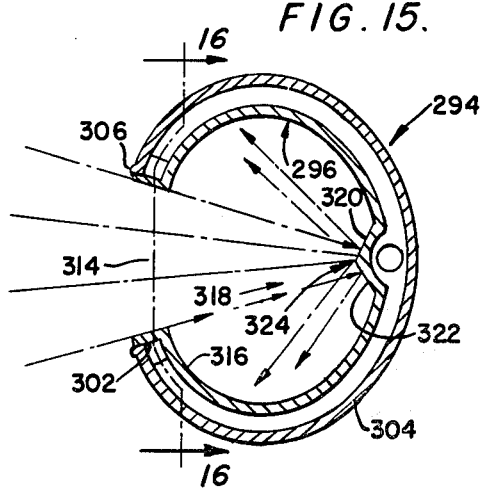
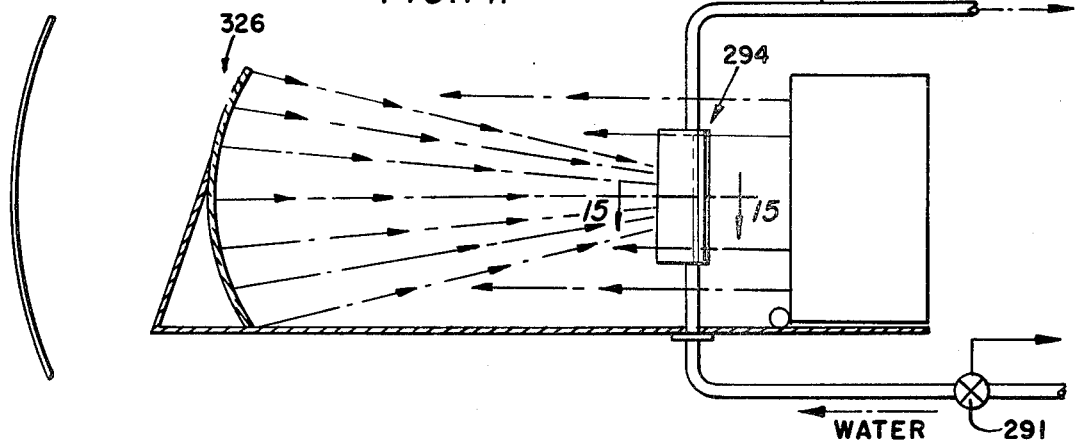

APPARATUS FOR DESALINATING WATER

This is a division, of application Ser. No. 625,850 filed Oct. 28, 1975 U.S. Pat. No. 4,118,283.

BACKGROUND OF THE INVENTION

The present invention relates to desalination, and, more particularly, to an apparatus and a method utilizing solar energy in the desalination process.

Distillation devices are used to purify volatile substances, and have found application in the chemical and petroleum industries. Recently, such devices have been used in desalination processes wherein salts are precipitated out of saline water to produce pure water. Recently, there has been an interest in applying distillation processes to desalinating large quantities of water. This interest has been sharpened due to droughts in vast land areas which are, however, located near great bodies of salt water. An apparatus and a process which efficiently desalinates large amounts of water could find wide applications in such drought ridden areas, as well as in densely populated areas which, at present, appear to have adequate water supplies.

Most known distillation devices suffer a common drawback of inefficiency, and hence are not suitable for use in such large scale applications. This inefficiency results in either low outputs of pure water or in extremely high power requirements. Therefore, known devices are either incapable of supplying the quantity of pure water reqiired, or require such high power inputs as to result in unacceptable environmental pollution.

Some known devices have somewhat remedied the inefficiency of the distillation process by utilizing solar energy as a means of augmenting the power input. The solar energy is commonly utilized during the vaporization step in the distillation process. However, these devices vaporize the water at atmospheric conditions, and the heat inputs required to vaporize water at atmospheric conditions is quite large. Therefore, the output of such devices is quite limited. These devices must be either unreasonably large or require large solar energy transfer devices. Thus, there are known devices which utilize solar energy in the vaporization step which employs solar grids covering several acres of area, the large amounts of land area are consumed by the solar heating means itself.

A further drawback of known devices results because the vaporization and condensation steps are carried out in a common chamber. Thus, the distillate often becomes recontaminated due to its proximity with the solid residue originally removed therefrom. It is for this reason that many of the known distillation devices provide recirculation systems for recycling the distillate in an attempt to assure total removal of substantially all of the solid contaminants. However, because of the above-mentioned proximity of the distillate and the solid residue, known processes are somewhat self-defeating. Because of the recycling procedure, the net output of known devices is further limited and total separation, along with efficiency, are goals which, in many ways, are exclusive of each other.

As is well known, as the pressure of a system is decreased, the saturation temperature of water in that system also decreases. For example, at atmospheric pressure, the saturation temperature of water is 212° F., at 10 psia it is 193.21° F., at 5 psia it is 162.24° F., at 1 psia it is 101.74° F., and at 0.0886 psia it is 32.02° F. (the triple point). Therefore, the power required to raise water to the saturation temperature is decreased as the pressure of the system is decreased. This fact is utilized by some known distillation systems. However, due to the nature of the elements used by these devices to produce the reduced pressure environment, only a small amount of liquid can be treated at one time. Furthermore, these devices do not produce a continuous flow through the distillation apparatus. Thus, the saline water is flooded into a chamber, the chamber is then closed off, a reduced pressure condition is then produced in the chamber, and then heat is input into the saline water to vaporize it. Therefore, inflow into the distillation apparatus is interrupted while the vaporization process is occurring, and the production of pure water of the system is therefore limited. Such a system is therefore not suitable for desalinating extremly large quantities of water. Furthermore, due to the nature of the pressure reduction step, the vaporization step is carried out in a chamber which communicates with the condensation chamber in such a way that the distillate is exposed to the solid residue, therefore producing the above-discussed possibility of recontaminating the distillate and thereby reducing the effectiveness of these systems.

In the device embodying the present invention, water is heated utilizing solar energy and then transferred to a vacuum chamber where it is vaporized and the water vapor separated from the solid residue in a continuous flow process. The water vapor is then transferred to a separate condensing chamber where it is condensed to form pure distilled water.

SUMMARY OF THE INVENTION

The saturation temperature of the contaminated water being vaporized by the distillation apparatus embodying the present invention is very low as compared to the saturation temperature thereof at atmospheric pressure. Furthermore, condensation of the water vapor occurs at, or near, atmospheric pressure and therefore the water vapor is at, or below, the saturation temperature of water at atmospheric pressure. Therefore, solar energy can be utilized to supply sufficient heat input to raise the temperature of large quantities of contaminated water above the saturation temperature required in the vaporization process occurring in the evaporation chamber. The water vapor is then transferred to a condensation chamber wherein the pressure is at, or near, atmospheric pressure, hence less heat has to be removed from the water vapor to condense it, and the condensation step occurs quite rapidly. Once vaporized, the water vapor and the solids dissolved therein are separated, and the vapor is condensed in a separate chamber, thereby substantially reducing the possibility of recontamination of the distillate with solids which have been removed from the contaminated water by the distillation process.

Hence, the apparatus and method embodying the present invention is capable of efficiency desalinating extremely large quantities of water which have been contaminated by solid particles being dissolved therein. The device can therefore utilize solar power to distill such contaminated water with an efficiency which is quite high as compared to known devices.

The apparatus embodying the present invention comprises a pump means located in a large body of water which has been contaminated by solid contaminants dissolved therein, such as a river or a salt sea. The pump transfers water from the body of water to a solar heating grid across which the contaminated water flows. The solar heating grid transfers solar energy to the water flowing thereacross in order to raise the temperature of that water to a predetermined level. A second pump means transfers the water from the solar grid to a storage means when that water has attained a prescribed temperature. Recirculation means are also provided to maintain the water on the solar heating grid until the prescribed water temperature has been attained. Another pump means is located in the storage means to transfer the water stored therein into the evaporation system of the apparatus.

The evaporation system comprises a dome structure having a piping system therein through which the water is circulated from the storage means. The dome structure also serves as a condensation means and therefore exposes the water being circulated through the piping system therein to the condensing vapors which preheat the water in the pipes of the dome structure, as well as removes heat from the water vapor during the condensation step.

From the dome structure, the water is transferred to a heater means located adjacent the dome structure. In the heater means, solar energy is focused on the water to raise it to a predetermined temperature. In the heater means, auxiliary heat input means can be used to compensate for reduced sunlight on cloudy days, or to augment the solar energy input and thereby further increase the output of the apparatus embodying the present invention.

A vaporizing chamber is positioned adjacent the above-mentioned heater, and the heated water is transferred thereto. Vacuum pumps are associated with the vaporizing chamber to reduce the pressure in the vaporizing chamber to a level so that the temperature of the incoming water is above the saturation temperature of that water. The water is sprayed onto moving belts in the vaporization chamber and vaporizes.

The water vapor is removed from the vaporization chamber by the vacuum pumps, and the solid residue, and the sludge, remains on the belts in the vaporization chamber. The residue and sludge is removed from the belts by means such as doctor blades, and is transferred to a removal system and is removed from the vaporization chamber.

The water vapor is transferred to the aforementioned dome wherein it is exposed to the pipes containing contaminated water. As the dome is at, or near, atmospheric pressure, the water vapor rapidly condenses to water and can be removed as pure water.

The system is so efficient that it is virtually self-supporting during hot, sunny days and can sustain operation for several days without additional sunlight before extensive auxiliary heating is required. Therefore, the apparatus and method embodying the present invention can be used for desalting extremely large bodies of water, such as rivers, in an efficient manner which does not itself pollute the environment.

Furthermore, the apparatus and method embodying the present invention produces a total reduction of contaminated water to a condition of either fresh water or a solid contaminant. The device can therefore be used extensively in re-cycling water for pollution control purposes, allowing the removal of valuable compounds, chemicals, and elements from polluted water while at the same time providing water that can be recycled through the plant again and again.

Because of the non-polluting and efficient manner in which the apparatus operates, it can safely be utilized in highly populated areas, and is therefore effective to provide such areas with a source of pure water.

OBJECTS OF THE INVENTION

Accordingly, it is the main object of the present invention to separate large quantities of pure water from a body of water which has been contaminated by solid contaminants dissolved therein.

It is a further object of the present invention to produce total separation of the contaminated water to a condition of either pure water or solid residue.

It is yet another object of the present invention to desalinate large quantities of water in an efficient and economical manner.

It is still a further object of the present invention to desalinate water in such a manner that large quantities of solid residue can be easily salvaged.

It is still another object of the present invention to desalinate large quantities of water with an apparatus which produces a minimum of environmental pollution.

It is yet a further object of the present invention to desalinate large quantities of water with an apparatus having low power requirements.

BRIEF DESCRIPTION OF THE DRAWINGS

FIG. 1 shows a plan view of the apparatus embodying the present invention located adjacent a body of contaminated water;

FIG. 2 is a vertical, sectional view taken along line 2—2 of FIG. 1;

FIG. 3 shows a detailed section of the solar heating grid utilized in the apparatus of the present invention and is taken along line 3—3 in FIG. 1;

FIGS. 6a and 6b show details of the vaporization apparatus used in the present invention and are taken along line 6a—6a in FIG. 5, and 6b—6b in FIG. 6a, respectively;

FIG. 7 is taken along line 7—7 of FIG. 6a and shows details of the belt system used in the vaporization apparatus;

FIG. 8 is a perspective view of the belts used in the system of FIG. 6a;

FIG. 9 shows details of a drive system used to drive the belts shown in FIGS. 7 and 8 and is taken along line 9—9 of FIG. 7;

FIGS. 10 and 11 show details of a system used to remove solid residue from the vaporization apparatus shown in FIGS. 6a and 6b;

FIGS. 13a–13c show details of a heater unit utilizing solar energy to heat the contaminated water prior to introduction thereof into the vaporization chamber of the apparatus of the present invention;

FIG. 14 shows details of a boiler system which is utilized with the FIG. 13 heater;

FIG. 15 is a schematic diagram of the system used to transfer solar energy to the water in the FIG. 13 heater;

DESCRIPTION OF THE PREFERRED EMBODIMENT

Figure 4:
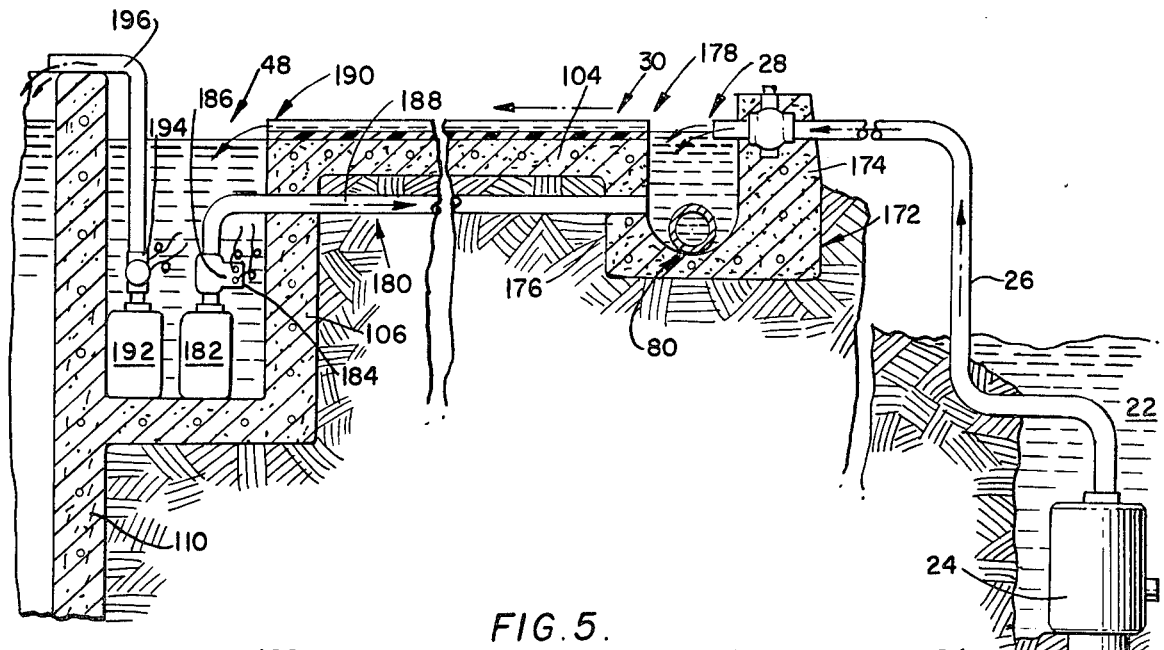
FIG. 4 shows a recirculation system used in the apparatus of the present invention and is taken along line 4—4 in FIG. 1.

Shown in FIG. 1 is a distillation apparatus 20 located adjacent a body of contaminated water, such as a river or sea 22, which has solid contaminants dissolved therein. A first pump 24 is located in the sea 22 and removes water therefrom. The removed water is transferred through a conduit 26 and into a header 28 which surrounds the apparatus 20 along the outer perimeter thereof. From the heater 28, the contaminated water flows across a solar heating grid 30 comprised of four sections 32–38. Each grid section comprises a plurality of parallel flow channels 40. As shown in FIG. 1, the flow channels of each grid section are parallel with each other and are perpendicularly disposed to the flow channels of the adjacent grid sections for inducing turbulence in the water flowing across the solar heating grid to thereby increase the heat transfer from the grid to the water flowing thereacross. Centrally disposed of the distillation apparatus 20 is a storage means 46 comprised of a moat or trough 48 which connects to the inner perimeter of the solar heating grid 30 at sections 52–56. Flow arrows 58 indicate the direction of flow across the solar heating grid 30 into the trough sections of trough 48. Located above storage means 46 is a heat transfer structure 64 comprised of a dome 66 and four vaporizer units 68–74 connected to the dome 66 by conduits 76. A pure water transfer duct 80 comprises a first section 82 connected to the dome 66 and traversing across the solar heating grid section 34 into header 28 and a circular second section 84, which is located in the header 28 and traverses the outer perimeter of the apparatus 20 in that header to connect with a third section 86. The third section 86 is connected to any suitable pure water usage or storage device. By locating second section 84 in the header 28, the hot pure water is utilized to transfer heat to the incoming contaminated water and thereby raise the temperature of that contaminated water to make effective use of the energy input into apparatus 20. A plurality of conveyor belts 90–96 are connected to the vaporizer units and extend radially outward therefrom to the outer perimeter of the distillation apparatus 20 and transfer the solids produced in the distillation process to convenient storage and/or usage devices. Arrows 98 indicate the direction of movement of the conveyor belts.

FIG. 2 is an elevation view on section 2—2 of the distillation apparatus 20. As shown in FIGS. 2 and 3, the solar heating grid 30 is mounted on a concrete base 100, which, in turn, is mounted on a dirt foundation 102 which supports the entire apparatus 20. The concrete base 100 comprises a horizontal section 104 which attaches at one end to header 28 and at the other end to vertical section 106 to form an outer wall of the trough 48. Another horizontal section 108 forms the bottom wall of the trough 48 and connects to the outer surface of wall 110 of a main storage tank 112 having a base 114 supported in the dirt foundation 102. The main storage tank 113 is large enough to contain enough water to supply the apparatus with water for approximately three days without interruption. A plastic material covering 116 covers the solar heating grid and the inside of the main storage tank 112. As shown in FIG. 2, a main platform 120 forms a mounting base and is supported by main support columns 122 and end support columns 124 mounted on the upper edge of the concrete wall 110. The main platform 120 is formed of reinforced concrete having reinforcing ties 126 therein and supports thereon the dome 66 and the vaporizing units, as well as the residue removal elements, such as conveyor belts 92 and 96. Located in tank 112 is a second pumping means 130 comprising a main pump 132 and an auxiliary pump 134 for removing water 136 which has been stored in the main storage tank 112. The two pumps feed into conduits 137 and 138 which are connected by a T-connection 140 to a common riser conduit 142. The common riser conduit 142 is comprised of a first section 144 and a second section 146 which passes which the main platform 120 upwardly into dome 66. The dome 66 is comprised of an outer wall 148 and an inner wall 150 and a plurality of preheater pipes 152 located inside the dome adjacent inner wall 150 and connected to outlet end 154 of section 146 of the riser conduit. As will be later discussed, a plurality of horizontal connecting conduits 158 interconnect vertical sections 160 of the preheater pipes 152. The conduits 76 and 162 connect the vaporizer units to the dome 66. Either, or both, of the pumps 132 and 134 can be used to withdraw water from the storage tank 112 and transfer it to the preheater pipes 152. The pumps 132 and 134, like pump 24, should be durable, and resistant to corrosion by the contaminants dissolved in the contaminated water being desalinated by the distillation apparatus 20.

As shown in FIG. 4, water removed from the sea 22 by the pump 24 is transferred through conduit 26 into a pipe coupling which distributes the water from conduit 26 into header 28 which is comprised of a footing section 172 and two wall sections 174 and 176, which connects to the horizontal portion 104 of the concrete base 100. As shown in FIG. 4, wall 176 forms with horizontal section 104 a spillover 178 over which the water from trough 28 flows onto the solar heating grid 30. The solar heating grid transfers solar energy to the water flowing thereacross to raise that water to a predetermined temperature. A recirculation system 180 comprising recirculation pump 182 having an intake 184 and a temperature control 186 and a return conduit 188 removes water from trough 48 and returns it to header 28 for further heating thereof. As shown in FIG. 4, the vertical wall 106 forms with horizontal section 104 a spillway 190 over which water from solar heating grid 130 flows into trough 48. When the water in trough 48 reaches the proper temperature, the recirculation pump 182 is shut down and transfer pump 192 comprising temperature control unit 194 and transfer conduit 196 is started to transfer water from the trough 48 into main storage tank 112 over wall 110. The trough 48 is sized to contain approximately a one day supply of water so that the apparatus 20 can operate uninterrupted for 4 full days without withdrawing water from the sea 22. A plurality of pumps 182 and 192 are located in the trough at various points therein, and, like the other pumps in the device, are durable and resistant to corrosion from the solid contaminants contained in the water being desalinated by the system. The pumps 182 and 192, like pumps 132 and 134, are submersible and hence any heat generated thereby is utilized to raise the temperature of the water in the storage system. For clarity's sake, the outer edge of the main platform 120 and the corresponding support column 124 is not shown in FIG. 4;

however, the main platform, as shown in FIG. 2, covers the entire top surface of the main storage tank 112.

Shown in FIG. 3 is a detail of the solar heating grid 30 taken along section 3—3 of FIG. 1. As shown in FIGS. 1 and 4, the solar heating grid 30 is at a higher elevation than the bottom of the main storage tank 112 and surrounds the outer periphery of that tank so that the main storage tank is centrally located within the solar heating grid and the outer perimeter thereof is circular.

FIG. 3 best shows the details of the solar heating grid 30. As shown, the solar heating grid comprises a gravel sub-base 200 overlying the dirt foundation 102, and upon which a layer of reinforced concrete 202 is overlaid. In the preferred embodiment, the concrete layer 202 is approximately 4 inches thick. The concrete is covered with an extruded, rigid, insulation board 204. In the preferred embodiment, the insulation board is either polystyrene or polyurethane. A plurality of protrusions 206 are formed on the insulation board to define the flow channels 40, as shown in FIG 1. The insulation board is covered with a coating 208, which, in the preferred embodiment, is Teflon. This coating corresponds to the covering like shown in FIG. 2, and, in fact, may be the same coating. The insulation board comprises a plurality of sections, such as section 210, which comprises longitudinal edges 212 and 214 and a top surface 216 which may have a protrusion thereon which is located intermediate the longitudinal edges 212 and 214. A protrusion 220 is positioned on the top surface 210 to project outwardly from longitudinal edge 212 so that the base 222 of the protrusion 220 extends outwardly from ledge 212 to form with longitudinal edge 212 a shoulder 224. A longitudinal edge 214 is received in the shoulder 224 with protrusion 220 overlapping the longitudinal edge 214 to interconnect the plurality of sections 210 together to form the quadrants of the solar heating grid 30. Glue, or other suitable fastening means, can be used to fix the plurality of sections together, and to the concrete base along the lower surface 226 of each of the sections 210.

In the preferred embodiment, the coating 208 is a dead black Teflon. Teflon is used for its high heat resistance and for its non-adhesion characteristics so that nothing will stick to it, including any possible salt deposits. Even though some of the water molecules passing over the solar heating grid will evaporate, the percentage of such evaporation will be so small that solid percipitation will be negligible, and the amount of water lost in the evaporation will also be negligible.

In the preferred embodiment, the flow velocity of the water crossing the solar heating grid will be adjusted so that the temperature of that water will be between 175° F. and 195° F. As discussed above, the flow velocity is somewhat controlled by the temperature controls 186 and 194 of the pumps positioned in the trough 48.

Another embodiment of the solar heating grid 30 will comprise a plurality of sections 210, each comprising only a single protrusion 220. This embodiment is the preferred embodiment, and is the one shown in FIG. 3.

As shown in FIG. 2, the main storage tank 112 will also be lined with insulation board similar to insulation board 204. Of course, the storage tank lining will not need protrusions similar to protrusions 206. Furthermore, the insulation board in the storage tank will also be placed over a concrete base 230 which is similar to the concrete base 100 forming the base of the solar heating grid 30, the base 114 of the storage tank 112 and the wall 110 of that storage tank.

As shown in FIG. 1, the preferred embodiment comprises a square storage tank, however, a circular storage tank may also be used.

Figure 5:
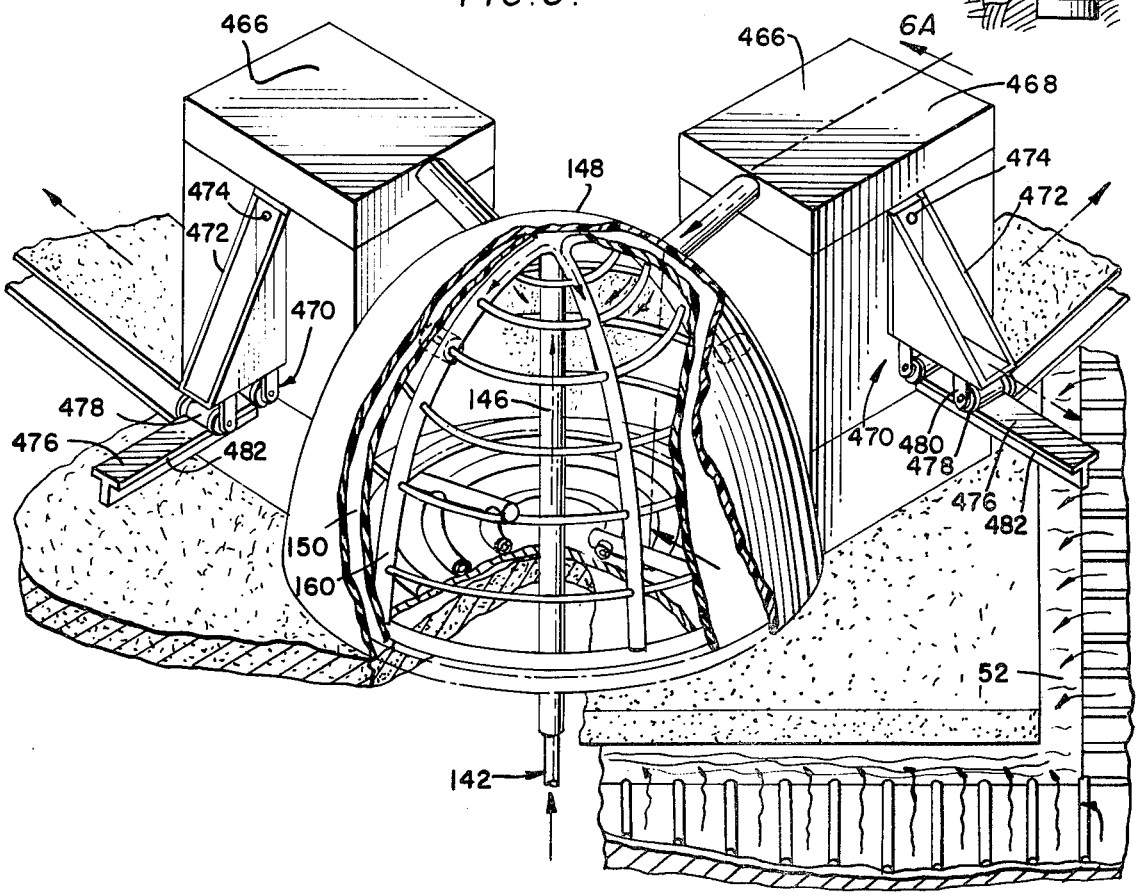
FIG. 5 shows a perspective, cut-away view of the dome structure utilized in the apparatus of the present invention.
Figure 12:
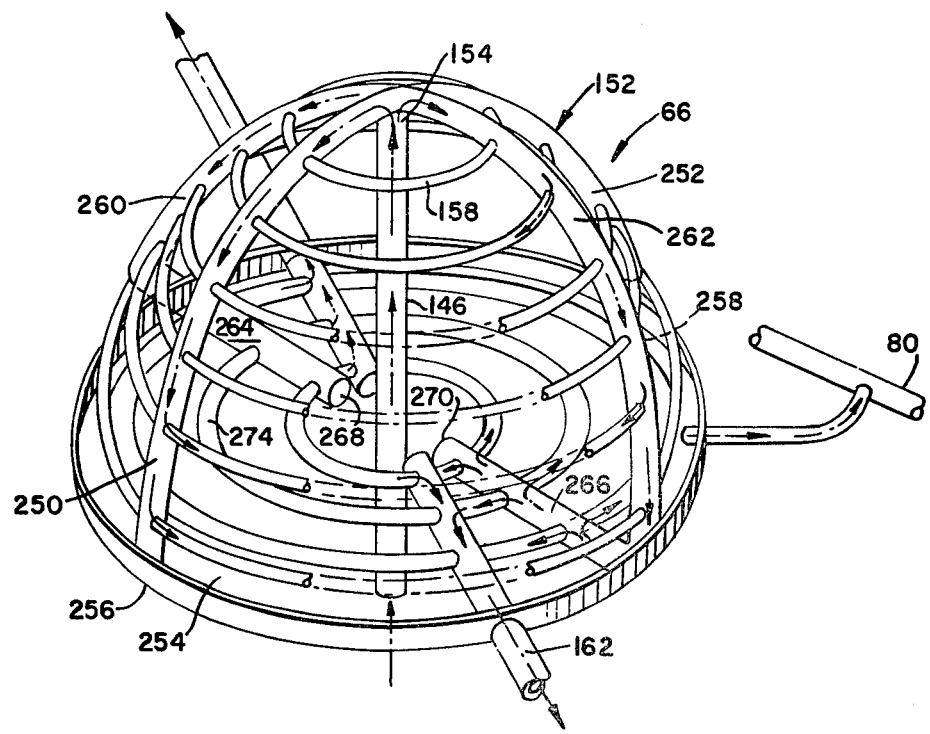
FIG. 12 shows details of the heating dome used in the apparatus of the present invention.

As shown in FIGS. 2, 5 and 12, dome 66 forms a heat transfer structure wherein water from main storage tank 112 is preheated and water vapor from vaporizer units 70 through 76 is condensed. As shown in FIGS. 1 and 2, the dome 66 is located centrally of the distillation apparatus 20 and supported on the main platform 120.

The arrangement of the preheater pipes 152 is best shown in FIG. 12, wherein water from the main storage tank is pumped through the section 146 of the riser pipe to top end 154. Two deadend pipes 250 and 252 are connected to the top end 154 and are mounted on the deck 254 of the dome. The deadend pipes comprise blank ends 256 and 258 mounted on diametrically opposite sides of the deck 254. The piping system further comprises pipes 260 and 262 having horizontal legs 264 and 266, respectively, mounted on diametrically opposite sides of the riser section 146 in the deck 254. Blank ends 268 and 270 of the pipes 260 and 262 are also located in the deck 254. As shown in FIG. 12, the pipes 250, 252, 260 and 262 divide the deck 254 into quadrants.

As shown in FIG. 12, a plurality of connecting pipes 158 connect the deadend pipes 250 and 252 to the pipes 260 and 262, and a plurality of deck pipes 274 connect the horizontal legs 264 and 266 of the pipes 260 and 262 to outlet conduits 162. As shown in FIG. 2, the outlet conduits 162 are connected to the vaporizer units. The pipes 250, 252, 260 and 262 serve as structural members to hold the dome upright and to retain water vapor transferred from the condensing units until it is condensed into water. Furthermore, the pipes provide cooling surfaces upon which the water vapor condenses and transfers the heat of condensation to the water being transferred from the main tank 112 to preheat that water. Therefore, water transferred into the dome from the main storage tank flows through all of the structural members. The water flows downward through deadend members 250 and 252, across connecting pipes 158 into pipes 260 and 262, and through deck pipes 274 into conduits 162. The water therefore flows on a circuitous path through the entire dome structure 66. The circuitous path maximizes the heat transfer characteristics of the heat transfer structure. Furthermore, the deadend members induce turbulent flow within the pipes to further increase the heat transfer between the condensing vapors and the water flowing in the pipes. Furthermore, the pipes are manufactured of a thermally conductive material to further promote the aforementioned heat transfer.

Figure 16:
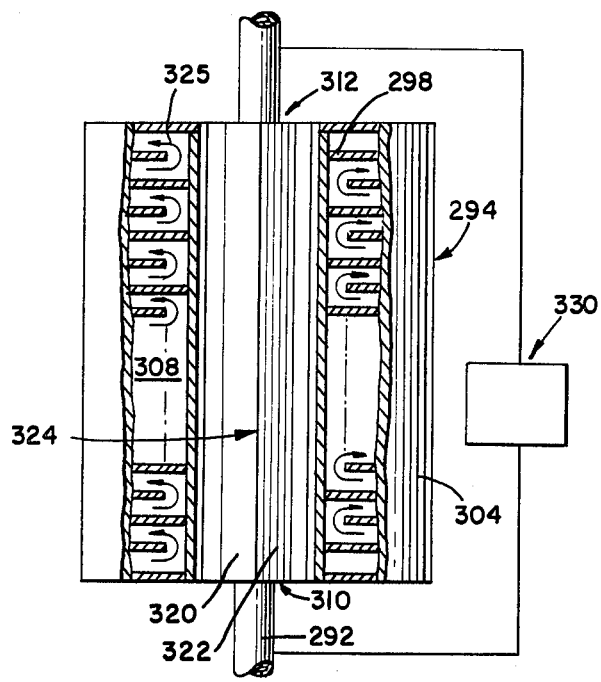
FIG. 16 shows further details of the solar transfer means shown in FIG. 15.
Figure 17:
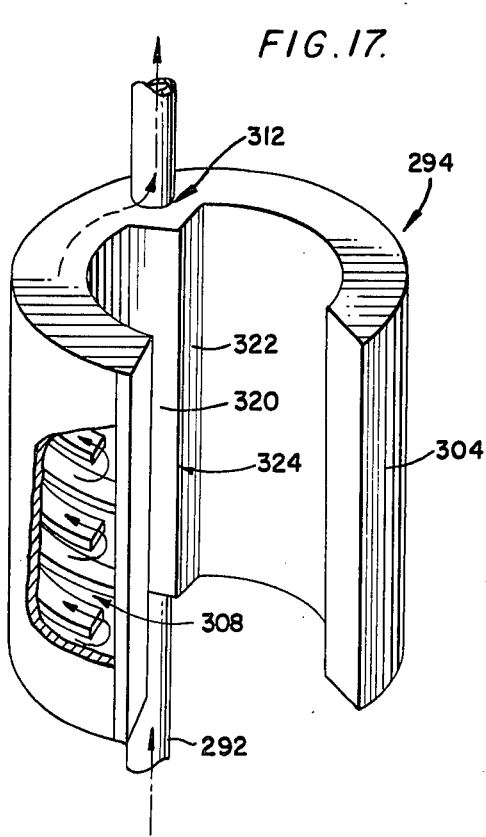
FIG. 17 is a perspective view of the boiler shown in FIG. 14.

From the dome 66, the water flows into final heaters 290, one of which is associated with each of the vaporizer units and is located adjacent the dome and the vaporizer unit. As shown in FIG. 13a, a valve 291 is positioned in conduit 162 and connects to a conduit 292 leading to a boiler 294. The boiler 294 is best shown in FIGS. 14 through 17, and comprises two pieces. A first piece is shown in FIG. 14, and comprises an aluminum casting 296 with vanes 298 on the outer periphery thereof. As shown in FIG. 17, these vanes stop short of the ends of the boiler alternately on each side at points 302, shown in FIG. 15. A segment of heavy aluminum pipe 304 is fitted over the outer surface of the aluminum casting and welded at point 306, and also around the top and bottom of the boiler. Thus, a closed vessel with alternate end fins is produced. The vessel forces the water to run first right and then left, as shown in FIG. 16, as it moves up through the heat exchange chamber 308 of the boiler from conduit 292 into inlet 310, and out through discharge outlet 312. The inlet and outlet are each tapped and threaded.

As shown in FIG. 15, the transverse cross-section of the boiler is C-shaped having an opening 314 and an inner surface 316 which comprises a peaked section 318. The peaked section 318 comprises two oppositely sloping planar surfaces 320 and 322 and an apex 324 formed by the inner section of the two planar surfaces. The peaked section runs longitudinally of the boiler and therefore serves as a ray dispersal means for dispersing solar rays entering the enclosure through opening 314. This feature will be discussed in greater detail below. The arrow 325 shows the path followed by the water as it flows through the heat exchange chamber 308.

As shown in FIG. 1, in the preferred embodiment there are four vaporizer units. Hence, there will be four final heaters. The boilers associated with each of the vaporizer units are oriented to receive solar radiation reflected by the first solar reflectors 326. The casting 296 is anodized dead black on the inside surface 316 to absorb the solar energy directed toward that surface. The temperature of the water passing through the boiler can be raised to any suitable level, even past the saturation temperature of that water, if so desired. The unit has a temperature control means 330 associated therewith which controls the flow rate of the water flowing through the boiler according the temperature desired for the effluent. The temperature control unit 330 can also be set to maintain the temperature of the water in the boiler below a level which would damage that unit, for instance 500° F., which may soften the aluminum to a point that it loses strength and ruptures under the pressure in the system.

An alternative embodiment of the boiler would comprise a stainless steel construction, wherein the water temperatures can be raised to extremely high levels to produce super-heated fluids.

As shown in FIG. 13a, a conduit 336 is connected to discharge outlet 312 and is coupled to a valve 338 which directs the heated fluid to either conduit 340 or conduit 342 in accordance with the condition of the distillation apparatus, as will be later discussed. Conduit 340 is connected to conduit 162 which is connected to an entrant header 346 of a solar energy transfer heater 348. The transfer heater 348 comprises a plurality of horizontal pipes 350 connected to the entrant header 346 and an effluent header 352, which is connected to a riser pipe 356. The riser pipe is also shown in FIG. 6a. Solar energy from second solar reflectors 357 is concentrated on the pipes 350 by third solar reflectors 360, as shown in FIG. 1. The conduit 342 connects to the riser pipe 356 to bypass the solar energy transfer heater 348, if so desired.

FIG. 13c shows the arrangement of the pipes 350 in the solar energy transfer heater 348. As shown, the pipes are arranged in rows which each have a steadily rising plane from the forward location 362 located on the outside of the unit, to the rearmost position 364 located on the inside of the unit. The rising plane enables each of the pipes to receive a portion of the light from the solar reflector 360 and the angle of contact between the light and the pipes will tend to reflect heat which has not been absorbed by each individual pipe into contact with surrounding pipes. Therefore, a major portion of the solar energy is utilized. The pipes are also staggered in vertical columns to maximize the heat transfer from an auxiliary heater 370 shown in FIG. 13b.

The auxiliary heater can, like the other pumps and motors, be either electric or fuel powered and is used to augment the heat transfer from the solar reflectors on cloudy days, or after dark.

The vertical and horizontal space in between the pipes 350 is arranged to produce a minimum of shadowing as well as a maximum area to receive heat from the auxiliary heaters. Therefore, the combination of the boiler 294 and the solar energy transfer heater 348 is a unique design which obtains a very high efficiency from three different heat sources, separately or simultaneously. First, when the sun is not shining, extra heat is added by the auxiliary heater 370. The heat pipes 350 are staggered so that direct impingement is obtained on every pipe as the heat rises through the transfer heater 348. Second, the pipes are arranged so that the light from the solar reflectors penetrates 50% of the way in from each side with equal surface exposure on each tube. Third, the inlet design of the entrant header 346 is arranged and connected to the conduit 162 such that high temperature water or steam from the boiler 294 will equalize itself and provide a uniform temperature rise throughout the boiler 348.

As shown in FIGS. 1 and 14, solar energy is reflected by second reflector 357 onto third reflector 360. As shown, the second reflector 357 is a segment of a cylinder and produces a vertical concentrated light band on reflector 360. The inside surface of the reflector 357 is a highly reflective coating, and in the preferred embodiment, the reflector 357 is a segment of a cylinder about 5 meters high and 10 meters wide, with a radius that produces a vertical concentrated light beam of about ¼ meter wide by approximately 5 meters high at a distance of 30 meters.

The light beam is caught by reflector 360 which is oriented to be in a horizontal plane, or, perpendicularly disposed to the second reflector 357. The third reflector, in the preferred embodiment, is one meter long and is approximately 6 meters high. The third solar reflector 360 has a radius sufficient to concentrate a light beam ¼ meter square on the side of the boiler pipes 350. The configuration shown in FIG. 13a produces a square light pattern sized to fit the solar energy transfer heater 348, as well as being sized for ease of manufacture. The third solar reflector 360 can be either a flat or a curved configuration. The reflector 357 is mounted and controlled so that as the angle of the sun changes, that reflector will follow to be properly oriented. The third reflector 360 is also hingeably mounted to be automatically oriented properly with respect to the solar energy transfer heater 348. The first solar reflector 326, shown in FIG. 14, is similar to the second solar reflector 357, shown in FIG. 1; however, the second stage reflector is slightly smaller than the solar reflector 360. The second stage reflector concentrates light on the boiler 294.

Figure 18:
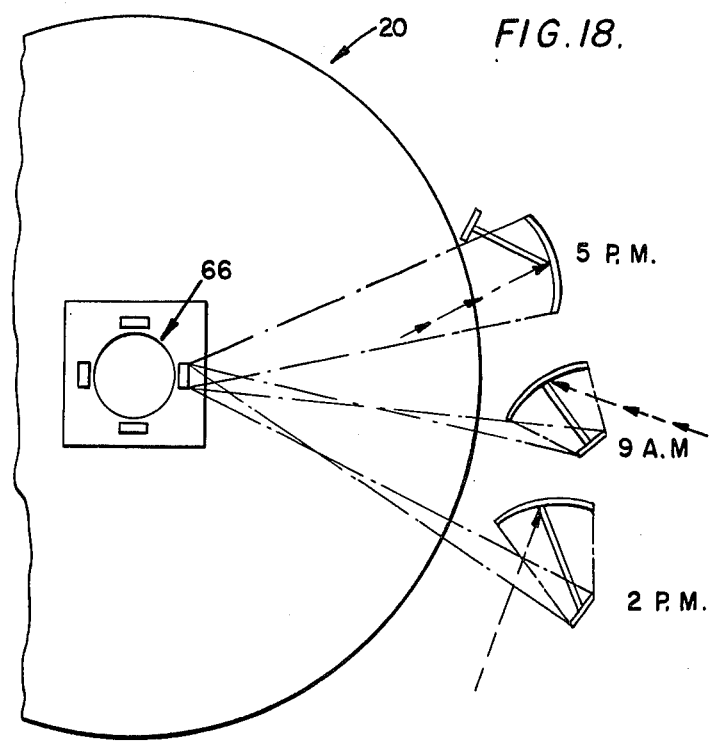
FIG. 18 is an overall schematic of the placement of solar transfer means used in conjunction with the FIG. 13 heater.

For the most efficient exposure of the reflectors to the sun's rays, these reflectors are set so that they will be exposed to the rays of the sun for a maximum number of daylight hours each day. An example of the setting of the reflectors is shown in FIG. 18. As shown in FIG. 18, the second stage reflector, which can be either reflector 380 or reflector 360, is a flat reflector. As shown in FIG. 18, the solar concentrator unit comprised of either first reflector 326 or second reflector 357 and the second stage reflectors is oriented so that part of the time the second stage reflector is used and part of the time the first stage reflector is used for the first reflection. Thus, when the sun's angle reaches a point to place the device 20 between the sun and the reflector, the sun's rays are reflected directly from the first stage reflector to the pipes 350, and as the angle with respect to the sun changes, the sun's rays are reflected from the first stage reflector to the second stage reflector and then to the pipes 350. A temperature controlled unit can be used to control the movement of the solar reflectors. Any suitable control means for controlling the solar reflectors and the elements associated therewith can be used, and an example of such control means is discussed in my co-pending application.

As shown in FIG. 6a, fluid from final heater 290 is transferred therefrom into a vaporizing chamber 400 by the riser pipe 356. The vaporizer unit is comprised of an outer casing 402 having a double upper wall with outer wall 404 and inner wall 406 defining therebetween a passageway 408 and lower wall 410 connected to casing 412 of the final heater 290 by weldments 414, or the like. Passageway 408 is sealed by a one-way valve 416 at one end thereof. Connected to outer casing 402 at the one end of the passageway 408 is vapor conduit 76 which is separated from the passageway 408 by the valve 416. As will be discussed below, water vapor produced in vaporizing chamber 400 is pumped into passageway 408 by a plurality of high speed pumps 420, and thence into conduit 76 for movement into the condensing area of the device 20.

The outer casing of the vaporization unit has a reinforced rib design, as shown in FIG. 6a, and comprises a plurality of ribs 424 which serve as stiffeners for the casing. The reinforcement of the casing is necessary because this chamber is under vacuum, and without reinforcement, the wall structure would have to be extremely heavy to prevent it from buckling due to the atmospheric pressure thereon. The outer casing in the preferred embodiment is steel with the stiffeners welded thereon. A plurality of support columns 426 connected to the base 410 and the main platform 120 serve to add additional support to the vaporization unit.

Figure 6B:
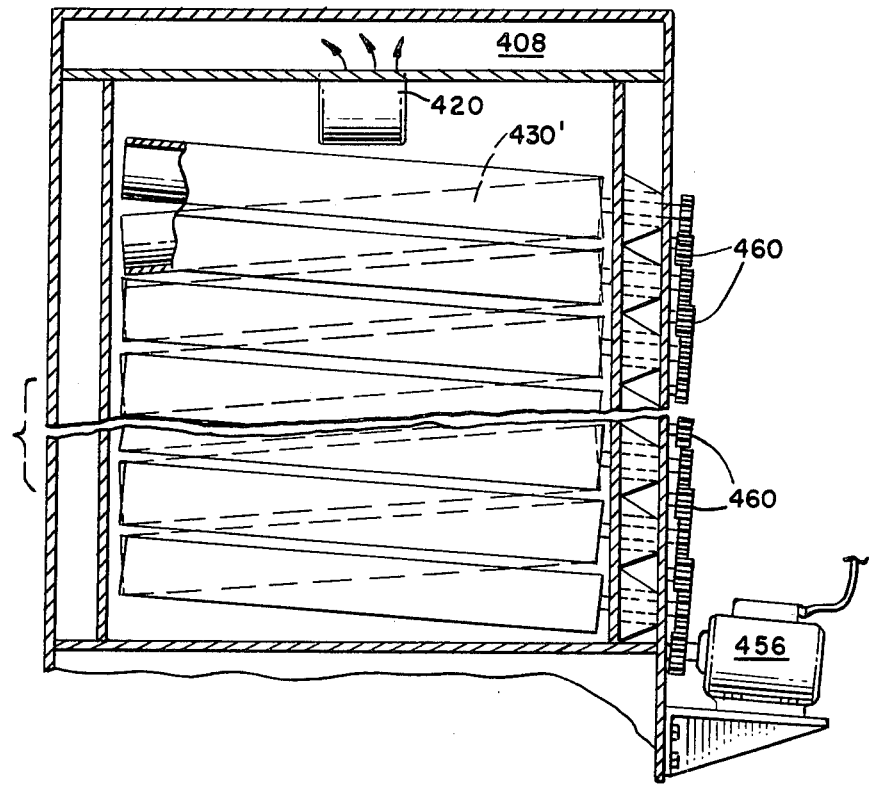

As shown in FIGS. 6a and 6b, the vaporization unit comprises a plurality of belts 430 mounted on rollers 432 and 434 in the vaporizing chamber 400. As is best shown in FIGS. 6b and 7, the belts are each inclined in two planes. Thus, each belt is pitched downwardly slightly from its anchor point, for example roller 434, and upwardly in a direction transverse thereto. Thus, as shown in FIG. 6b, the belts are inclined with respect to the horizontal plane of the main platform 120, and hence inclined along their longitudinal axis, and as shown in FIG. 7, are also pitched along an axis transverse thereto. Thus, as shown in FIG. 6b, a belt 430' is inclined upwardly from left to right in FIG. 6b, and from the front of the unit upwardly to the back of the unit. The belts are moving parallel to the plane of the paper in FIGS. 6a and 6b, and perpendicular to the plane of the paper in FIG. 7.

The riser pipe comprises first section 440 oriented to run longitudinally through the bottom thereof to a location closely adjacent the pumps 420, a horizontal second section 442, and a third vertical section 444 which runs from a position closely adjacent the pumps 420 down the side of the vaporizing chamber 400 on the inside thereof between rollers 434 and the inside of casing 402 to a position spaced from the bottom 410 of the vaporizer unit. A plurality of branch pipes 446 are each connected to the section 444 of the riser pipe and extend from section 444 inwardly of vaporizing chamber 400 toward the longitudinal center line thereof. Each of the branch pipes 446 comprises a plurality of holes spaced along the length thereof and acts as a sprayhead for spraying liquid which has been heated in final heater 290 and is flowing in the riser pipe 356 onto the belts 430. Each belt 430 has a branch pipe 446 associated therewith. Fluid sprayed from the sprayhead contacts the moving belts 430 on the top thereof as well as the bottom thereof, and is transported thereby.

The pumps 420 maintain a vacuum condition in the vaporizing chamber 400. The liquid in final heater 290 is heated to a temperature which will be above the saturation temperature corresponding to the pressure maintained in the vaporizing chamber 400, and therefore when the liquid is sprayed onto the moving belts, it vaporizes very rapidly. The vaporization is augmented because the belts develop very thin layers of water, which expedites the vaporization process. Because the belts are pitched in two planes, the vaporization process is further enhanced.

In the preferred embodiment, the belts 430 are either stainless steel or high temperature fiberglass-filled Teflon material.

A plurality of doctor blades 450, or other suitable means, are mounted in the vaporizing chamber 400 adjacent the rollers 432 to remove the solid residue which adheres to the belts 430 after the liquid has vaporized and has been separated therefrom. The residue is removed from the belts and is transferred to a dump-system which will be discussed below.

The rollers 432 and 434 are driven by motors 452 and 456, respectively, through a gear train which comprises a driving gear 460 associated with each roller and an idler gear 462 located between and meshing with the drive gears.

As shown in FIG. 5, the casing of each vaporizing unit comprises a fixed portion 466 and a movable cover 468. A moving means 470 comprises a triangular cart 472 fixed along one side thereof to the outside of the movable cover by fasteners 474 and mounted on a support beam 476 by wheels 478 attached to another side of the cart 472 by wheel mounts 480. The support beam 476 is a T-shaped beam having an upper flange 482 which has a width corresponding to the width of the wheels 478, so that those wheels roll, and are guided, thereon. The support beam is, itself, mounted on the main platform 120. When service is to be performed on the inside of the vaporizing chamber 400, the cart 470 is moved outwardly along the support rail 482, thus exposing the inside of the vaporizing chamber 400. For convenience, in the preferred embodiment, half of the rollers are mounted on the cover and half of the rollers are mounted on the fixed portion of the body of the vaporizing unit.

To facilitate removal of the cover, the drive gears 460 are mounted on the cover and are attached to the rollers 432 and/or 434 by stub shafts 490 (FIG. 7) having slots 492 in one end thereof which engage cooperating parts of the rollers to form a splined connection 494. The rollers and stub shafts are supported by flanges 496, or other suitable means mounted on the cover 468.

To achieve maximum production, the preferred embodiment comprises an airflow means 500 comprising a conduit 502 connected to the casing 402 of the vaporizing unit and to the inner wall 150 of the dome 66. A plurality of electric heaters 504 are located within the conduit 502 for heating the air flowing into the vaporizing chamber 400 through opening 506 from the inner volume of dome 66. As shown in FIG. 6a, opening 506 is located adjacent the bottom 410 of the unit and the end of section 444 of the riser pipe. The feed pipe and system 500 also serves as a recirculation system for recycling water vapor back into the vaporization chamber to achieve further purification thereof. The heaters 504 are maintained at a temperature which insures that air flowing into the vaporizing chamber 400 is at or above the mean temperature in the chamber 400.

Therefore, the water heated in final heater 290 is sprayed onto moving belts 430. The water vapor is mixed with the air from the auxiliary system 500 and withdrawn from vaporizing chamber 400 by pumps 420 which transfer the mixture into the passageway 408, and from there into conduit 76 leading to the interior of dome 66. The solid residue, and sludge, left behind through precipitation onto the belts 430 during the vaporization process is removed by the removal means, such as doctor blades 450, and moved into a dump system 510. In the preferred embodiment, the bottom two belts 512 and 514 have no water placed on them so that they can be used to make final evaporation of any water that overflows the belts above them. Therefore, no water will accumulate in the bottom of the chamber. Furthermore, in the preferred embodiment each belt has a deflector thereon so that no water is allowed to run on the inside of the belt where deposit would build up, thus causing problems.

As shown in FIGS. 6a, 10 and 11, the dump system 510 is positioned superadjacent conveyors 90-96 which are driven by conveyor drives 550. The dump system 510 drops the solid residue and sludge 552 onto the moving conveyors for removal from the device 20. The dump system 510 comprises three pairs of trap doors 560, 562 and 564 hingeably attached to an outer casing 566 by pivot pins 568 mounted in flanges 570. As shown in FIG. 11, the trap doors move from a horizontal closed position to an open position wherein each of the doors of a pair of doors is at an angle to the horizontal. A door stop 572 is mounted on the casing 566 and is located intermediate sides 574 and 576 of the casing. Door mounts 578 also have stops thereon for limiting the movement of the trap doors. As shown in FIG. 10, the movement of each of the trap door pairs is controlled by a door control system 580 comprising an actuating cylinder 582 having a piston controlled cylinder arm 584 connected to a connecting link 586 by a bell crank 588 pivotally mounted on flange 570 of door mount 578. Connecting link 586 is connected at one end of a follower arm 590 which is connected at the other end thereof to pivot pin 568 of door mount 578. Therefore, actuation of cylinder 582 causes bell crank 588 and follower arm 590 to rotate, thereby causing the trap doors to open. Actuation of cylinder 582 is controlled by a servocontrol system 592 according to the amount of solid material supported by the trap doors. A vacuum line 594 is connected to branch lines 596 and 598 to produce a vacuum in chambers 600 and 602 formed between the trap doors. Therefore, the doors can be opened without breaking the vacuum maintained inside vaporizing chamber 400.

The normal cycle for the dump system 510 is as follows: the belts accumulate solids and when the solids reach a sufficient thickness, they will be removed from the belts by the doctor blades as the belts pass around rollers 432. The solids then drop onto the top of trap doors 560, and when sufficient solids have been built up on the doors 560, a vacuum is drawn in chamber 602 and then the doors 560 are opened to allow the solids thereon to fall into chamber 602 onto doors 562. The doors 560 are then closed and the chamber 600 evacuated. When the chamber 600 reaches a sufficiently high vacuum, the doors 562 are opened and the solids are deposited on doors 564. The doors 562 are closed, and the doors 564 are opened to deposit the solids onto the moving conveyor belt subjacent the dump system 510. In this way, the solids can be removed from the vaporizing chamber 400 without breaking the vacuum conditions present in that chamber. Therefore, the distillation process can be a continuous one without need of interrupting the process to place more water in the vaporizing chamber, or to remove solids from that chamber. It is for this reason that great amounts of contaminated water can be efficiently distilled in a continuous process. As the solids move through the dump system 510, further solids can be deposited on the top doors 560 from the vaporizing chamber, thus maintaining the continuity of the operation.

In the preferred embodiment, the pumps 420 shown in FIG. 6a are two directional, high speed vacuum pumps having shafts which run in opposite directions and are powered by two totally enclosed electric motors, one for each shaft. The pumps remove the water vapor from the vaporizing chamber 400 and cause it to flow into conduit 76 via passageway 408. As shown in FIGS. 2 and 5, conduit 76 is in fluid communication with the interior of dome 66, therefore the water vapor flows into the inner volume of dome 66 where it contacts the pipes 152 and is condensed thereon.

The condensed water vapor is collected in a collecting means 610 located in deck 254 of the dome 66. The fresh water conduit 80 connects to the collection means 610 and transfers that pure water from the collection means across the solar heating grid, into the header 28, and out of the device 20 into a convenient storage or utilizing means. By transferring the hot water across the solar heating grid, the water is reheated and hence can transfer that heat to the water in the header 28 to increase the temperature of that water toward the level at which the pumping means located in trough 48 can move it into the storage tank 112. Therefore, the efficiency of the distillation device is maximized.

Therefore, the purpose of the piping system 152 is three-fold: First, the piping system provides a structural member to hold the fabric of the condensing dome to retain the vapor until such time as that vapor is condensed to water; second, the piping system provides cooling surfaces to promote condensing of the water vapor into water; and third, the piping system transfers the heat from the condensing steam to the incoming water to heat that water to a predetermined temperature prior to input into final heater 290.

Having described the structural details of the distillation device 20, a description of the operation thereof will now be presented with reference to FIGS. 1, 2 and 6a. Water is removed by first pump 24 from sea 22 and transferred into header 28, where heat is transferred thereto from the hot water and pure water transfer duct 80. The water moves over spillover 178 onto solar heating grid 30, where its temperature is increased to a predetermined level by the transfer of solar energy to the water flowing across the solar heating grid. The water flows over spillway 190 into trough 48 and is recycled by recirculation system 180 until the temperature of the water reaches a predetermined level, whereupon the water in trough 48 is transferred by pump 192 into main storage tank 112. Pumps 132 and 134 then transfer water from the main storage tank into piping system 148 via riser pipe 142. The water and piping system 152 is circulated through a circuitous path around the dome 66, where heat is transferred thereto from the water vapor condensing inside the dome. The water is then circulated via conduits 162 into final heaters 290, each associated with one of a plurality of vaporizing units located adjacent the dome 66. The water is either preheated in a boiler 294 or flows directly into an entrant header 346 of the solar energy transfer heater 348. The water in the boiler 294 and/or the transfer heater 348 is heated by either first solar reflectors 326 or second solar reflectors 357, respectively, to a predetermined temperature. The solar energy transfer heater 348 can also be heated by alternative means, such as auxiliary heater 370 shown in FIG. 13b. The water from either the solar energy transfer heater or the boiler 294 flows into the vaporizing chamber 400 via riser pipe 356. The riser pipe 356 has a plurality of sprayheads each associated with one of a plurality of moving belts located in the vaporizing chamber 400. The water is sprayed onto the moving belts by the sprayheads and is at a temperature which is above the saturation temperature corresponding to the pressure in the vaporizing chamber 400. Therefore, due to a combination of the saturation conditions in the vaporizing chamber and the turbulence induced by the movement of the belts in the vaporizing chamber 400, the water is caused to vaporize. The water vapor is mixed with heated air inducted into the vaporizing chamber through an auxiliary system 500 from the internal volume of the dome 66 and is educted from the vaporizing chamber by a plurality of pumps 420 into a passageway 408. The water vapor passes through a conduit 76 into the internal volume of the dome 66 while the solids and sludge precipitated from the water remain on the moving belts. When a sufficient thickness of solid is built up on the belts, the solids are removed from the belts by removal means, such as doctor blades 450, and moved into a dump system 510. The solids move through a plurality of chambers in the dump system 510 and are eventually deposited on conveyor means 90–96 without disturbing the vacuum maintained in vaporizing chamber 400. The water vapor flowing into the internal volume of the dome 66 condenses on the outside of the pipes in the piping system 152 and the pure water collected in a collecting means 610 located in the deck 254 of the dome 66 and transferred into a pure water transfer duct 80 by any convenient means, such as a pump, or other flow inducing means. The water is then removed from the distillation device to a disposal or utilizing means via a circuitous path which enables that pure water to transfer heat to the incoming contaminated water to increase the temperature of that contaminated water toward the predetermined level. The condensing vapors of the water vapor also transfer heat to that contaminated water, thereby maximizing the overall thermal efficiency of the distillation device 20. The casing of the vaporizing units is movable so that the internal elements of the vaporizing chamber can be exposed for servicing thereof, and the solar reflectors are movable to insure maximum utilization of the sun's radiation during the daylight hours. Furthermore, the belts in the vaporizing chamber are tilted in two planes to further maximize the vaporization process due to the turbulence induced thereon by that tilting.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A distillation device comprising:
   a first water transfer means for withdrawing contaminated water from a body of water having solid contaminants dissolved therein;
   a grid connected to said first water transfer means so that contaminated water received from said body of water flows across said grid, said grid having an outer peripheral edge and an inner peripheral edge and comprising a header located on said grid outer peripheral edge and fluidly connected to said first water transfer means so that contaminated water flows into said header from the body of water, said header being fluidly attached to said grid so that contaminated water flows from said header onto said grid whereby contaminated water flows from the body of water to said grid via said header, and a trough located on said grid inner peripheral edge and fluidly attached to said grid so that contaminated water flows into said trough from said grid, and means for transferring solar energy to said water flowing across said grid;
   a water storage means having a side wall attached to said grid trough so that contaminated water flowing on said grid flows into said water storage means via said trough;
   second water transfer means connected with said water storage means for removing contaminated water from said storage means;
   a third water transfer means located in said trough and connected to said water storage means for transferring water from said trough to said water storage means and temperature control means connected to said third water transfer means for actuating said third water transfer means when the temperature of said water in said trough reaches or exceeds said predetermined temperature so that only water having a temperature which equals or exceeds said predetermined temperature is transferred to said water storage means;
   a heat exchange structure connected to said water storage means;
   a recirculation apparatus mounted in said trough and connected to said header for recirculating said water from said trough back to said header prior to transferring water from said trough into said water storage means and temperature control means connected to said recirculation apparatus for actuating said apparatus when the temperature of said water in said trough falls below a predetermined temperature;
   a vaporizer means connected to said heat exchange structure for separating said water from said solid contaminants dissolved therein, said vaporizer means having a solar concentrator means for transferring solar energy to said contaminated water flowing from said heat exchange structure into said vaporizer means;

vacuum producing means for producing a vacuum in said vaporizer means so that said contaminated water is vaporized under vacuum conditions to form water vapor and thereby separate said water from said solid contaminants, and solid removing means connected to said vaporizer means for removing said solid contaminants from said vaporizer means;

water vapor transfer means connected to said vaporizer means for removing said water vapor from said vaporizer means;

condenser means connected to said water vapor transfer means for condensing said water vapor to form distilled water which is free of solid contaminants; and distillate transfer means connected to said condenser means for withdrawing condensed water from said condenser means;

wherein said vaporizing means includes:

a casing having a top and a bottom;

inlet means connected to said casing through which hot water flows into the vaporizing means during an evaporation step of the distillation process;

a plurality of belts movably attached to said casing on the inside thereof;

vacuum producing means connected to said casing for producing a vacuum inside said casing to maintain a predetermined pressure inside said casing so that the temperature of said hot water exceeds the saturation temperature thereof corresponding to said predetermined pressure;

means connected to said case for moving said belts;

spray means connected to said inlet means associated with each of said movable belts for spraying said hot water onto said belts;

vapor removal means connected to said casing for removing water vapor produced by the vaporization of said hot water in said vaporizing means so that said water vapor is separated from solids dissolved in said hot water; and means for removing said solids from said vaporizing means.

2. The distillation device defined in claim 1, wherein said case comprises a movable door and further including means for moving said door.

3. The distillation device defined in claim 2, wherein half of said means for moving said belts are connected to said door.

4. The distillation device defined in claim 3, wherein said vaporizing unit comprises a front and a back and a pair of sides, and wherein said movable door is located on said front, and further wherein said movable belts are each inclined in two planes.

5. The distillation device defined in claim 4, wherein said belts mounted on said movable door are inclined downwardly therefrom and downwardly from one side of said case, and said belts mounted on said case are inclined upwardly toward said door and downwardly from the other side of said case.

6. The distillation device defined in claim 5, wherein said inlet means comprises a conduit connected to said case bottom and extending longitudinally through said case to said case top.

7. The distillation device defined in claim 6, wherein said vacuum producing means comprises a plurality of pumps connected to said case adjacent said case top.

8. The distillation device defined in claim 7, further including a plurality of stiffeners connected to said case to reinforce said case for preventing the collapse thereof when a vacuum condition exists within said case.

9. The distillation device defined in claim 8, further including an inner wall located adjacent said case top wall to define with said top wall a vapor removal passageway, said pumps discharging vapor into said passageway for removing said vapor from said vaporizing means, said passageway including a valve means located at one end thereof for preventing backflow of ambient air into said passage means.

10. The distillation device defined in claim 9, wherein said case has a hole defined in one side thereof adjacent said case bottom, and further including an auxiliary air conduit connected at one end to said case over said hole and including means for heating air flowing through said conduit into said vaporizing means for providing said vaporizing means with air heated to a predetermined temperature, thereby producing an airflux through said case toward said vacuum producing means, whereby said water vapor is removed from said vaporizing means.

11. The distillation device defined in claim 10, further including detachable couplings mounted on said movable door for selectively coupling and decoupling said belt moving means to said movable door so that said movable door can be removed from said case while said belts remain in place within said case.

12. The distillation device defined in claim 11, further including a solids removal means for removing said solids separated from said water vapor in the vaporizing means.

13. The distillation device defined in claim 12, wherein said solids removal means includes a plurality of doctor blades mounted on said case adjacent said belt moving means for removing solids remaining on said belts after said water has been vaporized.

14. The distillation device defined in claim 13, wherein said solids removal means further includes a trap door located in said case bottom for removing said solids from said vaporizing means.

* * * * *